United States Patent Office 3,524,904
Patented Aug. 18, 1970

3,524,904
GRAFT COPOLYMER PREPARATION VIA PEROXIDATION BY HIGH ENERGY IRRADIATION
Edmund F. Baxter, Jr., Cleveland Heights, Ohio, assignor to Esso Research and Engineering Company, a corporation of Delaware
No Drawing. Continuation-in-part of application Ser. No. 858,563, Dec. 10, 1959. This application Mar. 17, 1966, Ser. No. 534,999
Int. Cl. C08f 27/00
U.S. Cl. 260—877       3 Claims

ABSTRACT OF THE DISCLOSURE

This invention concerns the preparation of a graft copolymer wherein a peroxidizable polymer backbone is subjected to high energy radiation in the presence of oxygen at a temperature no greater than 40° F., and preferably at least as low as 32° F., after which the peroxidized polymer is heated in the presence of a selected monomer at a sufficiently high temperature to decompose the peroxide groups and effect the desired graft polymerization. The advance over the prior art is in use of the low temperature during the irradiation step, leading to improved yields and enhanced quality of graft copolymer. Examples of the invention include the grafting of N-vinyl pyrrolidone onto a backbone of a copolymer of vinyl acetate and mixed aliphatic alcohol esters of fumaric acid, and the grafting of vinyl pyrrolidone onto a backbone of polymethyl methacrylate.

---

This application is a continuation-in-part of application Ser. No. 858,563, filed Dec. 10, 1959, and now abandoned.

This invention concerns the preparation of valuable copolymers by grafting certain polymerizable unsaturated monomers to polymeric materials under closely controlled conditions, including a step involving the peroxidation of the polymeric materials.

Polymers and copolymers have many commercial uses. Among these are included plastics, coatings, drying oils, synthetic rubber, and the like. Many copolymers that are mineral-oil-soluble have been found useful as additives for heating oils to improve their sludge dispersant characteristics and as additives for lubricating oils wherein they serve as viscosity index improvers, detergents, and pour point depressants.

One class of copolymers that is of particular interest is that known as graft copolymers. Such copolymers are characterized by a structure wherein side chains of polymeric proportions are chemically tied at random points to a backbone structure that is also of polymeric proportions. The side chains and the backbone originate from different monomers.

A random copolymer of monomers A and B has a structure that can be represented by a formula such as:

whereas a graft copolymer structure may be represented by a formula such as:

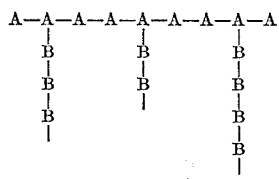

One method that can be employed for the preparation of graft copolymers consists in subjecting a mixture of a polymer, and a monomer that differs from the constituent monomers of the polymer, to high energy ionizing radiation. The irradiation creates a plurality of randomly spaced active sites along the backbone polymer chain. Some of the grafting monomer molecules attach themselves to these active sites and then form polymeric side chains with other molecules of the same monomer. Graft copolymers can also be prepared by forming hydroperoxide groups on the backbone polymer and subsequently decomposing those groups in the presence of a monomer.

In peroxide or hydroperoxide grafting the perovide or hydroperoxide group decomposes to give a —C—O• radical to which one of the grafting molecules attaches through one of the carbons of the double bond, forming a —C—O—R• linkage, and then additional molecules of the grafting monomer enter into a polymerization reaction with the —R• radical, thus forming the polymeric side chain which is attached to the backbone monomer through an oxygen linkage.

In accordance with the present invention it has now been found that superior yields of graft copolymers are formed, and the quality of the graft copolymers is enhanced, if the polymer backbone is subjected to high energy radiation in the presence of oxygen at a temperature no greater than 40° F., and preferably at least as low as 32° F., to prepare a peroxidized polymer, and the latter is subsequently heated in the presence of a selected monomer at a sufficiently high temperature to decompose the peroxide groups and effect the desired graft polymerization.

The high energy ionizing radiation may be supplied by naturally occurring radioactive materials, such as radium and its compounds, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 64 (europium) and their compounds. They are formed in the course of converting uranium, plutonium and other fissionable material in an atomic reactor. Ionizing radiation from such sources has an energy equivalent to at least 30 electron volts.

Materials made radioactive by exposure to neutron radiation, such as radioactive cobalt (Co 60), europium 152 or europium 154, which emit gamma rays, may likewise be used. Suitable sources of high velocity electrons are also the beams of electron accelerators, such as the Van de Graaf generator or the betatron. In general, however, high intensity gamma radiation and its well-known sources, such as nuclear fission by-products and materials made radioactive by neutron radiation are particularly preferred for the purposes of the invention mainly because of the relatively high penerating power of the gamma rays and the availability and ease of application of these sources of gamma radiation. Also, a combination of gamma rays and neutrons is a preferred type of radiation.

The polymer backbone employed in practicing the present invention may be a homopolymer, i.e., a polymeric material that originates from a single constituent monomer or it may be a copolymer of two or more constituent monomers. The molecular weights of the backbone polymers may vary within fairly wide limits and will depend to a large extent upon the size and nature of the graft copolymer that is desired.

In general, the molecular weights of the starting polymer backbones used in this invention will range from about 500 to about $5 \times 10^6$ (Staudinger molecular weights).

The monomers that may be used for preparing the polymeric backbones or for the subsequent grafting step are compounds having a carbon-to-carbon double bond and include monoolefins, diolefins, haloolefins, esters of acrylic and methacrylic acid, vinyl esters, vinyl ethers, esters of alpha, beta-unsaturated dibasic acids, and unsaturated nitriles. Specific monomers include isobutylene, styrene, butadiene, isoprene, vinyl chloride, methyl acrylate, methyl methacrylate, lauryl methacrylate, vinyl acetate, vinyl isobutyl ether, octyl fumarate, acrylonitrile, vinyl pyrrolidone, and other.

Preferably the backbone polymer is one containing tertiary hydrogen atoms. Vinyl type polymers, e.g., vinyl esters or esters of methacrylic acid are particularly suitable. Vinyl type compounds are also preferred as the grafting monomers and include vinyl ethers, vinyl esters such as vinyl acetate, vinyl acylates, vinyl pyridine, acrylonitrile and vinyl carbazole.

The polymer chains useful as backbones for grafting according to the methods of this invention may be prepared by any one of the appropriate techniques well known to the art, using catalysts appropriate to the system. Such catalysts include metal alkyls, Friedel-Crafts catalysts, peroxides and free radical catalysts. Backbone polymers may, in some cases, be prepared by ionizing radiation without the use of catalysts. The method of backbone polymer preparation is not limiting.

It is preferred that the irradiation and grafting be conducted in hydrocarbon solution and particularly in paraffin hydrocarbon solution, as for example in hexane or heptane because such materials have low chain transferability. The proportion of grafting monomer to polymer backbone should be relatively low to prevent too great a side chain buildup in the grafts. A proportion of about 1 part by weight of monomer to from about 2 to about 5 parts of backbone polymer by weight is preferred.

Radiation intensity will range from 0.05 to $50 \times 10^6$ rep per hour or preferably from about 0.1 to $5 \times 10^6$ rep per hour. Total dosages will range from $1 \times 10^5$ to $1 \times 10^9$ rep but are preferably within the limits of $1 \times 10^6$ to $5 \times 10^7$ rep.

The irradiation and oxidation may take place at from atmospheric pressure to about 3 atmospheres of pressure. Any oxygen-containing gas that is free of undesired components may be used as the source of oxygen. As stated above, the irradiation and oxidation should be conducted at temperatures no higher than 40° F. A temperature range of from about 0° F. to about 32° F. is preferred. In the subsequent graft polymerization step a temperature is used that is sufficient to decompose peroxide groups but that is not so high as to cause decomposition to be undesirably rapid.

A specific copolymer that has been improved by the grafting procedure of the present invention is one that has found use as an additive for imparting viscosity index improving and detergency properties to a lubricating oil. The copolymer comprises vinyl acetate and a mixture of the dialkyl fumarates of tallow alcohols and of $C_8$ Oxo alcohols. The tallow alcohols employed in making the fumarate esters are commercially available mixtures of $C_{14}$, $C_{16}$, and $C_{18}$ aliphatic monohydric alcohols, the major proportion constituting $C_{16}$ and $C_{18}$ alcohols. The $C_8$ Oxo alcohols are well known and consist essentially of branched chain primary 8-carbon-atom monohydric alcohols that are prepared from $C_7$ olefins, carbon monoxide and hydrogen in the presence of a Group VIII metal catalyst, which is commonly cobalt. The primary product of this reaction consists of organic carbonyl compounds, mainly $C_8$ aldehydes, having one more carbon atom per molecule than the olefinic feed material. These aldehydes are converted to corresponding alcohols in a subsequent hydrogenation step.

The following examples serve to illustrate the present invention.

EXAMPLE 1

Preparation of backbone polymer

A polymeric additive having detergency and pour point depressant properties when added to lubricating oil was prepared from mixed fumarate esters and vinyl acetate in the following manner. Tallow fumarate and $C_8$ Oxo fumarate were separately prepared from the alcohols and fumaric acid. The dialkyl fumarates were copolymerized with vinyl acetate in heptane solution in the presence of from about 0.2 to about 0.4 wt. percent tertiary butyl perbenzoate as a catalyst. The esters were employed in the following proportions:

Tallow fumarate—6½ lbs. (.0115 mole)
$C_8$ Oxo fumarate—16½ lbs. (.0485 mole)
Vinyl acetate—12½ lbs. (.157 mole)

The copolymerization was conducted for about 6 hours at a temperature of about 180° F. The product was distilled to remove excess vinyl acetate and the heptane solvent. The distillation residue consisted of a rubbery polymer having a molecular weight of about 20,000 Staudinger. Although 2 to 3 molar proportions of vinyl acetate were used per mole of fumarate the polymer obtained contained about equimolar proportions of acetate and fumarate.

EXAMPLE 2

(Graft copolymer preparation)

Part A.—The polymer of Example 1 was purified by dissolving it in hexane and precipitating it into methanol, this being repeated 4 times. The solvent was filtered off from the precipitated polymer and the latter was then dried under vacuum. The free fumarate content of the purified polymer was about 1.8 wt. percent. A solution of 9 grams of the purified polymer thus obtained was prepared in 45.5 grams of heptane. The solution was irradiated from a cobalt-60 source for 6 hours using a dose rate of 0.2 megarep per hour at room temperature. During the irradiation, excess oxygen was bubbled through the solution continouosly. The resulting peroxidized polymer was mixed with a solution containing 0.55 gram of N-vinyl-2-pyrrolidone and 81.4 grams of heptane and the mixture was heated for 4 hours at 150° F. The solution containing the graft copolymer reaction product was then diluted with hexane, the diluted solution was washed with water to remove homopolymer of pyrrolidone, and the water-washed solution was dried over sodium carbonate. The dried solution was filtered to remove $Na_2CO_3$, then solvent was stripped from the filtrate and the graft copolymer was finally heated under vacuum to constant weight. The yield of polymer was 8.9 grams and is contained 0.06 wt. percent nitrogen. On this basis the calculated wt. percent of N-vinyl-2-pyrrolidone in the polymer was 0.48. This material is hereinafter referred to as Graft Copolymer A.

Part B.—In the same manner as in Part A a solution of 9 grams of the purified polymer of Example 1 in 27 grams of heptane was irradiated in the presence of excess oxygen at 32° F. rather than at room temperature. At the conclusion of the irradiation step a solution of the peroxidized polymer and 4.5 grams of N-vinyl pyrrolidone in 76.5 grams of heptane was heated for 4 hours at 150° F. and the graft copolymer thereby obtained was subsequently treated in the same manner as Part A. The yield was 9.3 grams of graft copolymer containing 0.889 wt. percent of nitrogen. Based on this, the calculated wt. percent N-vinyl-2-pyrrolidone was 7.13. This material is hereinafter referred to as Graft Copolymer B.

EXAMPLE 3

Separate blends of the copolymer of Example 1 and of Graft Copolymers A and B were prepared in a light mineral oil identified as Solvent 100 Neutral. 3 wt. percent of copolymer was present in each blend. The viscosities and viscosity indexes of each of the blends were determined. The sludge dispersing properties of each blend were also ascertained, using the following procedure.

A quantity of crankcase sludge produced in the actual operation of automotive engines was obtained and was stirred for 20 minutes to ensure uniformity. Portions of the sludge were then mixed with the oils to be tested. In each case 89 grams of the test oil, 1 gram of water, and 10 grams of sludge were weighed into a tall beaker. Each sample was then placed in a 200° F. oil bath for ½ hour. The heated samples were removed from the oil bath, and each was stirred for 10 minutes with a single beater of the egg beater or cake mixer type, at a standard speed. Each of the stirred samples was poured into a separate 100 cc. graduated cylinder and placed in the oil bath for 24 hours at 200° F. At the end of this time, the top 25 cc. of the mixture in each graduated cylinder was withdrawn and placed in a 100 cc. centrifuge tube and diluted to a volume of 100 cc. with heptane, the mixture being well shaken. The material in each tube was then centrifuged at 1700 r.p.m. for ½ hour, and the amount of sludge at the bottom of the tube was ascertained. The criterion used is that a perfect oil from the sludge dispersancy standpoint is one that will give 1 cc. of sludge in this test. Less desirable oils from the sludge dispersancy standpoint will give less than 1 cc. of sludge.

The results obtained are presented in Table I. It will be seen that Graft Copolymer B of Example 2 gave the highest viscosity index and that it was much superior to the other copolymers in its sludge dispersing action.

solution remaining after the last fractionation. The evaporation residue was then extracted with water to remove unreacted vinyl pyrrolidone and homopolymer. The analyses of the various fractions are presented in Table II.

TABLE II.—ANALYSIS OF GRAFT COPOLYMERS FROM VINYL PYRROLIDONE AND POLYMETHYL METHACRYLATE

| Fraction | Polymer grafting index | Percent nitrogen |
|---|---|---|
| Peroxidation at 80° F.: | | |
| 1 | 76.5 | 0.31 |
| 2 | 3.3 | 0.47 |
| 3 | 1.3 | 0.77 |
| Residue | 20.0 | 4.65 |
| Water-insolubles in residue | 18.7 | 2.59 |
| Peroxidation at 32° F.: | | |
| 1 | 48.0 | 0.33 |
| 2 | 2.0 | 2.01 |
| 3 | 2.0 | 1.64 |
| Residue | 113.0 | 8.56 |
| Water-insolubles in residue | 88.0 | 7.11 |

It will be seen from the results obtained that considerably more vinyl pyrrolidone was grafted onto the methacrylate polymer when the peroxidation was conducted at 32° F. rather than at 80° F. This is indicated by the greater solubility of the 32° F. product in the methanol-acetone mixture and the much higher nitrogen contents of the fractionation residue and of its water-insoluble portion as compared to those from the 80° F. product.

The Polymer Grafting Index used in Table II is a numerical indication of the relative amounts of graft poly-

TABLE I

| | | | 3 wt. percent blend of copolymer in solvent 100 neutral | | |
|---|---|---|---|---|---|
| Copolymer | Temp. of peroxidation, ° F. | Wt. percent monomer in copolymer | V.I. | Vis. SUS at 210° F. | Cc. of sludge suspended |
| Example 1 | | | 155 | 75.70 | 0.012 |
| Graft copolymer A | 70 | 0.48 | 152 | 53.72 | 0.025 |
| Graft copolymer B | 32 | 7.13 | 157 | 58.7 | 0.77 |

Graft copolymers of the present invention may be added to mineral lubricating oils for both sludge dispersing action and for viscosity index improvement. In general, depending upon the particular copolymer used they will be employed in concentration ranges of from 1 to 15 wt. percent, the higher concentrations being used when greater viscosity index improvement is desired. For sludge dispersancy, from about 2 to 6% concentration will normally be used. These copolymers may also be added to heating oils as sediment dispersants, generally in weight concentration ranges of about 0.002 to 0.05%. They may also be added to gasoline to promote engine cleanliness.

EXAMPLE 4

A commercially available sample of polymethyl methacrylate having a molecular weight of approximately 100,000 was dissolved in 10% concentration in benzene. The solution was irradiated by mixed reactor flux pile irradiation, while a slow flow of oxygen was maintained through the solution. Two separate runs were made with separate portions of the solution, one at 32° F. and the other at 80° F. The total radiation dose in each case after 20 minutes of irradiation was $3.6 \times 10^7$ rep. After irradiation was complete, each sample was mixed with N-vinyl pyrrolidone and heated under reflux for 2 hours. The solvent and excess monomer were then removed from the product by distillation and the residue was fractionated and analyzed. The fractionation was conducted in the following manner: The residue remaining after distillation of solvent and excess monomer under reduced pressure on a steam bath was dissolved in 200 cc. of acetone and the polymer was precipitated from solution by the addition of successive 200 cc. portions of methanol. After each addition of methanol, the precipitated polymer was centrifuged and removed from the solution still remaining. Solvent was removed by evaporation from the separated mer in each of the fractions. It is calculated from the formula:

$$\text{Index} = \frac{\text{Weight of the Fraction}}{\text{Total Weight of Original Backbone Polymer}} \times 100$$

The specific examples presented herein are for the purpose of illustrating the invention and are not intended to limit it in any manner. The scope of the invention is to be determined by the appended claims.

What is claimed is:

1. A process for preparing a graft copolymer which comprises subjecting a copolymer of vinyl acetate and a dialkyl fumarate having alkyl groups in the range of from 8 to 18 carbon atoms to high energy ionizing radiation in the presence of oxygen at a temperature in the range of 0° F. to 32° F., whereby peroxidation of the said copolymer results, mixing the peroxidized copolymer with N-vinyl pyrrolidone and heating the mixture to a temperature sufficient to effect decomposition of peroxide groups.

2. Process as defined by claim 1 wherein the proportion of N-vinyl pyrrolidone to peroxidized copolymer is in the range of 1 part by weight of N-vinyl pyrrolidone to from about 2 to about 5 parts by weight of peroxidized copolymer.

3. Process as defined by claim 1 wherein said irradiation step and said step of contacting peroxidized copolymer with N-vinyl pyrrolidone are conducted in the presence of a paraffin hydrocarbon solvent.

References Cited

UNITED STATES PATENTS

| 2,837,496 | 6/1958 | Vandenberg | 260—877 |
| 2,911,391 | 11/1959 | Vandenberg | 260—877 |

(Other references on following page)

UNITED STATES PATENTS 3,081,242  3/1963  Smith et al. _____ 204—159.15
3,089,832  5/1963  Black et al. _____ 204—159.15

FOREIGN PATENTS 809,838  3/1959  Great Britain.

OTHER REFERENCES

Ballantine et al.: Jour. Polymer Sci., 34, pp. 419–438, especially p. 428, January 1959.

MURRAY TILLMAN, Primary Examiner

M. J. TULLY, Assistant Examiner

U.S. Cl. X.R.

260—875, 877, 879, 881, 884, 885; 252—9, 59; 204—159.15, 159.16, 159.17